(No Model.)
J. LAIDLAW.
CENTRIFUGAL MACHINE.
No. 591,770. Patented Oct. 12, 1897.
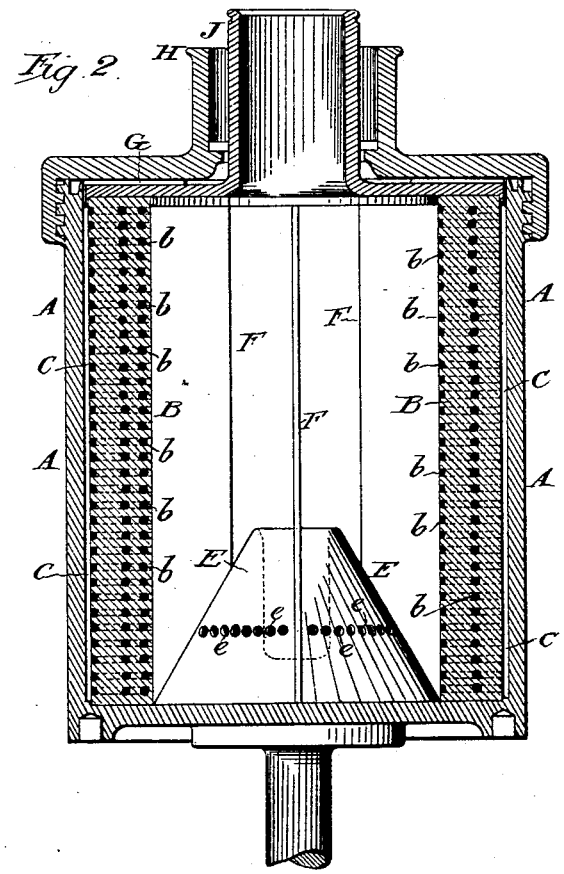
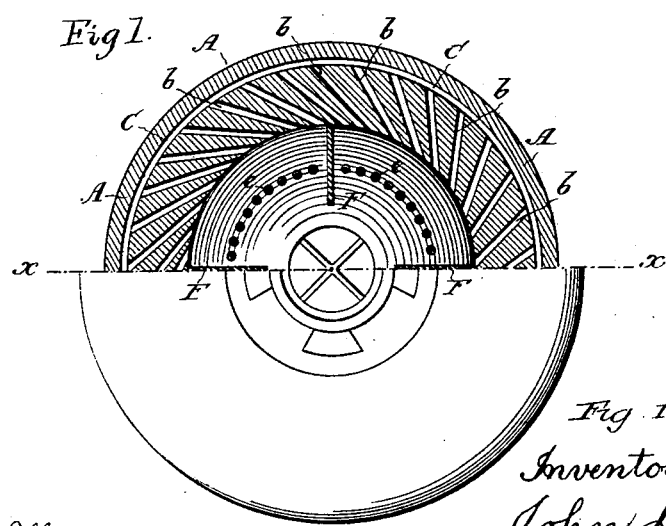
Attest.
Walter E. Allen.
Jas. W. White.
Inventor:
John Laidlaw.
By Knight Bros
Attys.

UNITED STATES PATENT OFFICE.

JOHN LAIDLAW, OF GLASGOW, SCOTLAND.

CENTRIFUGAL MACHINE.

SPECIFICATION forming part of Letters Patent No. 591,770, dated October 12, 1897.

Application filed January 16, 1896. Serial No. 575,769. (No model.)

*To all whom it may concern:*

Be it known that I, JOHN LAIDLAW, of the firm of Watson, Laidlaw & Co., engineers, 98 Dundas Street, south, in the city of Glasgow, North Britain, have invented Improvements in Centrifugal Machines for Separating Fluids of Different Densities, of which the following is a specification.

This invention relates to improvements in apparatus for separating fluids of different specific gravities by centrifugal action.

It is more particularly applicable to the separation of cream from milk, and has for its object a quicker and more perfect separation than has hitherto been attained.

In carrying out my invention I divide the separating-drum into a series of small chambers, the whole of which rotate along with the drum. These chambers are in the form of small horizontal tangentially-arranged tubes or passages inclined to the radius of the drum.

In the drawings, Figure 1 is a part plan and part horizontal section, and Fig. 2 is a vertical section on the line $xx$, of a centrifugal drum, showing my improvements.

A A is the drum, which is of sufficient strength to resist the pressure due to centrifugal force.

B B is a liner or annular ring, in which are bored a series of horizontal holes $bb$, forming chambers of small cross-sectional area by which the milk is divided into small quantities. The direction of these holes is inclined to the radius, as seen more particularly in Fig. 1, as I have found in practice that by such an arrangement a much more efficient separation takes place. Between the outer edge of the liner and the drum an annular space C is left, into which skim-milk flows. The whole milk is brought into the drum at the bottom by means of a central tube and passes through a series of holes $e$ in the cone E to the separating-chambers. Several vanes F are provided to carry the liquid round. The whole milk passing through the holes $e$ in the cone E is brought to the separating-chamber near the middle of the mass of liquid, so that when the drum is rapidly rotated the cream and milk begin to separate as soon as the liquid passes through the holes in the cone. The liquid passes by centrifugal force into the chamber, and is thus divided into small quantities, which assist the separation of the cream from the milk. The skim-milk passes into the annular ring between the liner and the drum and then through passages G and is discharged over the lip H into the skim-milk receptacle. The cream flows in toward the center of the drum, rises up, and is discharged over the upper lip I.

Having now particularly described and ascertained the nature of my said invention and in what manner the same is to be performed, I declare that what I claim is—

A centrifugal machine for separating liquids of different densities comprising a drum, an annular liner having series of horizontal tangential bores, and located within the drum so as to leave an annular space between the walls of the liner and the drum, the cone provided with holes and located within the liner, and the radial vanes within the liner, substantially as described.

In testimony whereof I have signed my name to this specification in the presence of two witnesses.

JOHN LAIDLAW.

Witnesses:
   JOHN LIDDLE,
   ARTHUR HARTLEY YUILE.